United States Patent [19]

Watanabe et al.

[11] Patent Number: 4,730,248

[45] Date of Patent: Mar. 8, 1988

[54] SUBROUTINE LINK CONTROL SYSTEM AND APPARATUS THEREFOR IN A DATA PROCESSING APPARATUS

[75] Inventors: Hiroshi Watanabe; Takeshi Kato, both of Hitachi, Japan

[73] Assignee: Hitachi, Ltd., Tokyo, Japan

[21] Appl. No.: 645,673

[22] Filed: Aug. 30, 1984

[30] Foreign Application Priority Data

Sep. 2, 1983 [JP] Japan .................. 58-160454

[51] Int. Cl.$^4$ .................. G06F 9/30; G06F 12/00
[52] U.S. Cl. .................................. 364/200
[58] Field of Search ... 364/200 MS File, 900 MS File

[56] References Cited

U.S. PATENT DOCUMENTS 3,348,211 10/1967 Ghiron ........................... 364/200
4,041,462 9/1977 Davis et al. ..................... 364/200

Primary Examiner—Raulfe B. Zache
Assistant Examiner—William G. Niessen
Attorney, Agent, or Firm—Antonelli, Terry & Wands

[57] ABSTRACT

A data processing apparatus having a subroutine processing function which saves and resumes the contents of general registers at the time of shifting into a subroutine or at the time of resume processing. Three layers of general registers are provided, each layer being comprised of a group of registers of a plurality of stages. The layers are connected in the form of a ring while coupling the corresponding registers of neighboring layers for each bit, so that the data can be batchwisely transferred in both directions. When shifted into a subroutine, the contents of a group of registers of the layer that had been used before the shifting are batchwisely transferred to a group of registers of a neighboring layers. The subroutine to which the operation is shifted uses the layer to which the data are transferred.

8 Claims, 14 Drawing Figures

SUBROUTINE LINK CONTROL SYSTEM AND APPARATUS THEREFOR IN A DATA PROCESSING APPARATUS

BACKGROUND OF THE INVENTION

The present invention relates to a data processing apparatus having a subroutine processing function, and particularly to a subroutine link control system which is capable of shifting into a subroutine and returning therefrom at high speeds, and an apparatus therefor.

The subroutine processing function refers to the processing in which, when shifting into a subroutine, the contents of a group of general registers used for the arithmetic operation are saved in a main memory unit or by an exclusively designed memory and, when returning from the subroutine, the saved data is returned from the main memory unit or the exclusively designed memory into a group of general registers.

In the field of control computers in recent years, it has been a trend to increase the operation speed of the arithmetic circuit, to increase the number of general registers, to increase the capacity of main memory unit, and to standardize the program. A cache memory which is a high-speed memory having a small capacity has been employed accompanying the trend toward increasing the capacity of the main memory unit. With this memory, however, the writing operation is slower than the reading operation, and the number of subroutines is on the increase due to standardization of program.

Therefore, although the arithmetic circuit operates at high speeds, extended periods of time are required for saving the contents of general registers and for resuming the contents required by the subroutine processing, making it difficult to perform the processing at high speeds as a whole.

For instance, if the load which occupies about 10% of the subroutine processing increases to about 50%, the speed of processing is not increased as a whole even if the operation speed of the arithmetic circuit is doubled.

In a system in which the contents of a group of general registers are saved by an embedded exclusive memory when shifting into the subroutine, the operation speed can be increased as compared with the system in which the contents are saved by the main memory unit. However, since the contents of a group of general registers are saved for every register, extended periods of time are required for the saving when there exist a large number of registers that have to be saved.

If the general registers are divided into a plurality of groups and are used with each group as a unit when shifting into a subroutine or returning therefrom, the saving and resuming of subroutine can be performed within very short periods of time.

In shifting into a subroutine or returning therefrom, however, the following matters will have to be taken into consideration.

(1) Since the subroutine is nested in a plurality of stages, a countermeasure must be taken with regard to overflow of the nest.

(2) Not only must the data be saved and resumed, the data must further be handed over.

(3) A function is necessary to designate which one should be saved (without destroying it) among the groups of general registers.

A subroutine link control system which operates at high speeds has not, yet been proposed, to satisfy the above-mentioned requirements.

SUMMARY OF THE INVENTION

The object of the present invention is to provide a subroutine link control system in a data processing apparatus, which is capable of reducing the time required for shifting into the subroutine or for returning from the subroutine.

The object of the present invention can be substantially realized by the method described below.

A group of general registers (usually, 8 to 16 registers) used for the arithmetic operation are organized in the form of a single layer. According to the present invention, there are provided at least three such layers which are connected in the form of a ring to couple corresponding registers of neighboring layers together one bit by one, bit, such that the data can be transferred as a batch in two directions. Then, when shifting into the subroutine, the contents of a group of registers of a layer that had been used before being shifted are transferred as a batch into a group of registers of a neighboring layer.

In this case, in the subroutine of the shifted side, use is made of a layer to which the data is transferred, and the contents of a group of registers of the layer that had been used before being shifted are maintained unchanged to cope with the return from the subroutine.

Among the three layers, the remaining one layer is maintained in a vacant condition. The layer maintained in a vacant condition is the one that is storing the oldest saved data, and is rendered to assume the vacant condition after saved by a data saving memory unit that is separately provided.

Here, the data saving memory unit has a memory capacity which is several times as great as that of the layer, and is provided such that the subroutines are allowed to assume a continuous nest construction. When the subroutines are linked, the data saving memory unit successively stores the data of the oldest layer. When returning from the subroutine, the data saving memory unit successively reads the data of the newest layer among those storing the data.

DESCRIPTION OF THE PREFERRED EMBODIMENT

Figure 1:
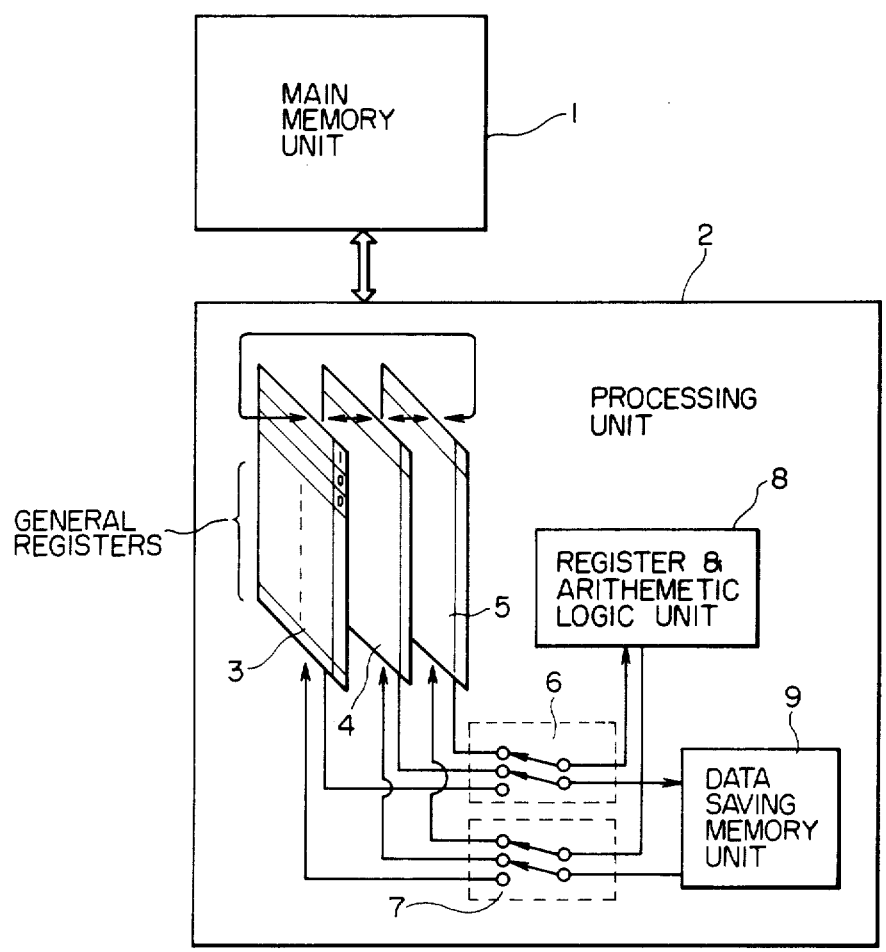
FIG. 1 is a diagram illustrating the outline of a hardware structure according to the present invention.

FIG. 1 shows the outline of a hardware structure according to the present invention. First, the principle of the present invention will be explained below with reference to FIG. 2.

Reference numerals 3, 4 and 5 denote groups of general registers that are coupled in the form of rings. Each group of general registers are constituted in the form of shift registers such that the data can be transferred in units of a bit. Therefore, the data can be transferred from the group 3 to the group 4, from the group 4 to the group 5, and from the group 5 to the group 3, or from the group 3 to the group 5, from the group 5 to the group 4, and from the group 4 to the group 3. Namely, the data can be transferred in two directions.

Each one of these groups 3, 4, 5 of general registers is referred to as a layer. In this embodiment, there are three layers. As described in the summary of the invention, one layer 3 among the three layers is used for the currently required purpose, another layer 4 is used for storing the data of the general register of the original program so that the original program can be instantly resumed at the time of subroutine, and the remaining layer 5 is used so that the linking can be effected instantly at the time of subroutine linking, i.e., to provide another layer for the subroutine that is linked, while leaving untouched the layer 3 that is now being used to save the data.

A data saving memory unit 9 has a memory capacity that is several times as great as that of the layer, and is provided to cope with the case where the subroutines are linked continuously. When the subroutines are linked, the data saving memory unit 9 successively stores the data of the oldest layer. When returning from the subroutines, the data saving memory unit successively reads the data which have been stored in the newest layer.

Figure 2:
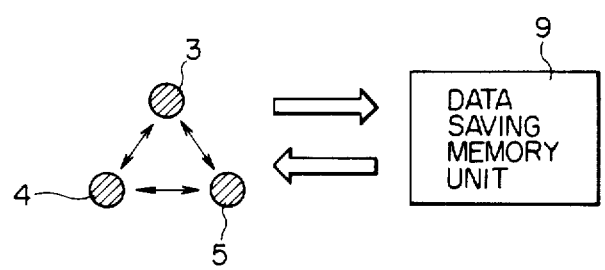
FIG. 2 is a diagram illustrating the principle of the present invention.
Figure 3:
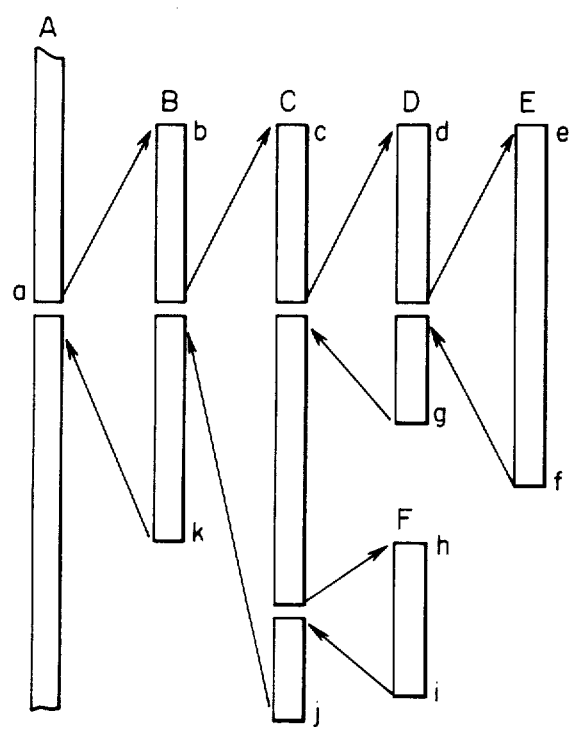
FIG. 3 is a diagram showing the transition of subroutine to illustrate the present invention.
Figure 4:
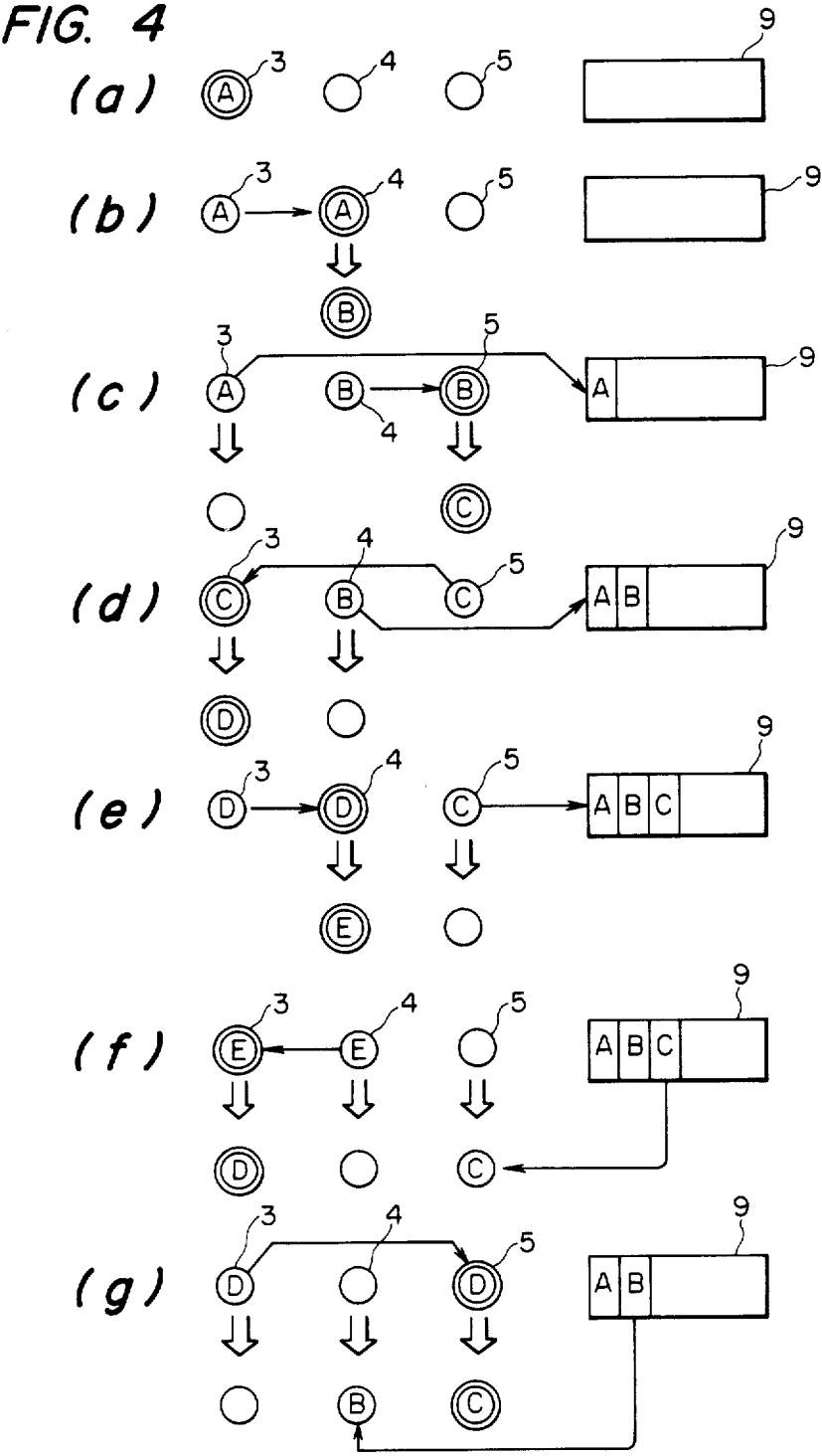
FIGS. 4 and 5 are diagrams for illustrating the principle of the present invention.
Figure 5:
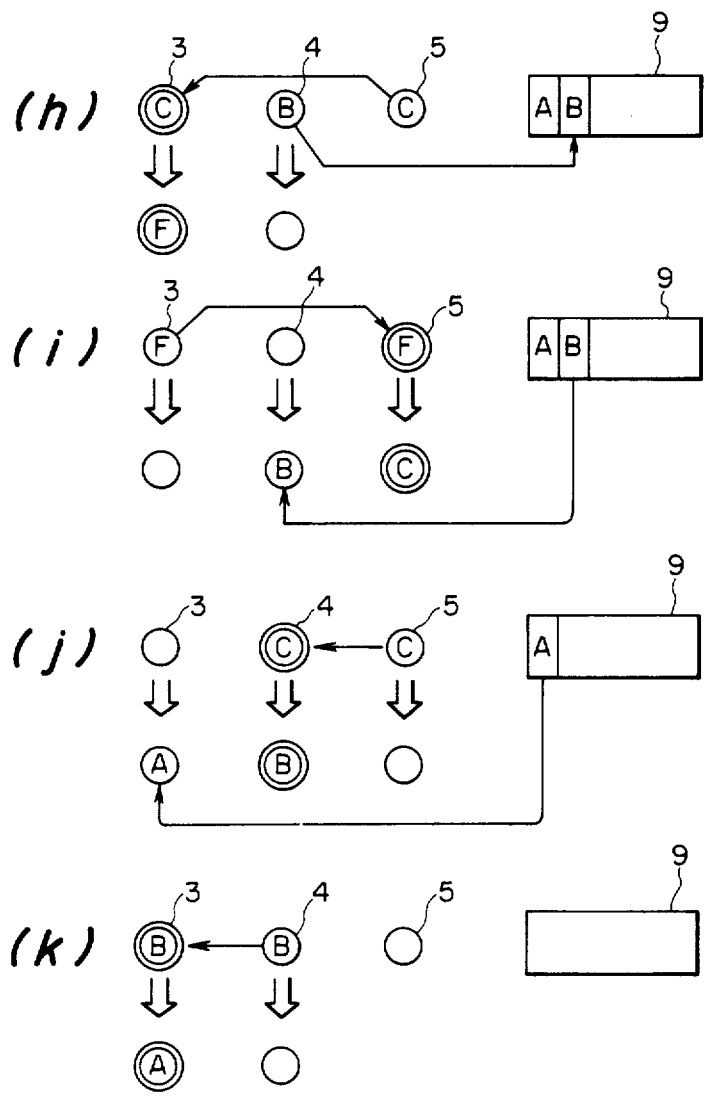

FIGS. 4 and 5 show the movement of data when the subroutines are linked and returned repetitively as shown in FIG. 3 relying upon the construction of FIG. 2. In FIG. 3, symbol A denotes a main routine, and symbols B, C, D, E and F denote subroutines.

Symbol a represents the state just before the main routine A is linked to the subroutine B, and symbols b, c, d, e and h represent points of processing when the subroutines are linked. Symbols f, g, i, j and k represent points of processing when the subroutines are returned.

Diagrams (a) to (k) of FIGS. 4 and 5 illustrate contents of data of the registers of the three layers 3 to 5 at each of these points, illustrate layers to be used for the subroutines, and illustrate transfer of data to the data saving memory unit 9. In the drawings, A to F denote data during the processing by the subroutine or by the main routine, or denote the results of processing by the subroutine. Double circles denote a layer that is now being used. Hollow arrows indicate the case where processing is effected by the subroutine and the data of the subroutine is input to the data (that is to be processed and handed over by the subroutine) which is initially transferred at the point, or indicate the case where a vacancy is formed due to the transfer of data to the data saving memory unit 9.

First, the description starts from a point a. At the point a, the main routine A is being executed as shown in FIG. 4(a). Therefore, a layer 3 among the three layers is used for the main routine A. Considered below is the case when the main routine A is linked to the subroutine B. At the point b, the layer 3 is changed to the layer 4 as shown in FIG. 4(b), and the subroutine B utilizes the layer 4. Since outputs of the subroutine B are stored in the general registers, the contents of the layer 4 are shifted from A to B.

At the point c where the subroutine B is linked to the subroutine C, the layer 4 is changed to the layer 5 and, at the same time, the contents of the layer 3 are transferred to the data saving memory unit 9. Therefore, the layer 5 changes from B to C, and the layer 3 changes from A to vacant.

At the point d, the contents of the layer 5 are shifted to the layer 3 as shown in FIG. 4(d), and the contents of the layer 4 are shifted to the data saving memory unit 9. Here, the layer 3 is used for the subroutine D, and changes from C to D.

At the point e, the contents of the layer 3 are transferred to the layer 4 as shown in FIG. 4(e), and the operation is performed using the layer 4. At the same time, the interim results of processing by the subroutine C, that are the contents of the layer 5, are transferred to the data saving memory unit 9. At this moment, the interim results of subroutine D are stored in the layer 3, the layer 4 is used for the subroutine E, and the layer 5 becomes vacant after the data are transferred into the data saving memory unit 9. The data saving memory stores interim results of subroutines A, B and C.

At the point f, the return processing is effected to return from the subroutine E to the subroutine D as shown in FIG. 4(f). Namely, the contents of the layer 4 are transferred to the layer 3, and the subroutine D is carried out using the layer 3. At the same time, the saved data C is read out from the data saving memory unit 9 and is stored in the layer 5.

At the point g, the contents D of the layer 3 are transferred to the layer 5 as shown in FIG. 4(g), and the operation is effected using the layer 5. At the same time, the data B is transferred from the data saving memory unit 9 to the layer 4.

At the point h, the general registers are saved to link again the subroutine as shown in FIG. 5(h). Namely, the contents of the layer 5 by which the subroutine C had been executed are transferred to the layer 3, and the subroutine F is executed using the layer 3. At the same time, the interim results of subroutine B stored in the layer 4 are saved again by the data saving memory unit 9.

At the point i, the subroutine F is returned to the subroutine C as shown in FIG. 5(i). Namely, the contents F of the layer 3 are transferred to the layer 5, and the subroutine C is executed using the layer 5. At the same time, the interim results of subroutine B are transferred from the data saving memory unit 9 to the layer 4.

At the point j, the subroutine C is returned to the subroutine B as shown in FIG. 5(j). The contents of the layer 5 are transferred to the layer 4, and the subroutine B is executed using the layer 4. At the same time, the main program save data A which are saved data A are transferred from the data saving memory unit 9 to the layer 3.

Finally, at the point k, the subroutine B is returned to the main routine A as shown in FIG. 5(k). The contents of the layer 4 are transferred to the layer 3, and the main routine, is executed using the layer 3.

In the foregoing there has been described the processing for saving and resuming general registers in the processing of subroutines based upon the combination of groups 3 to 5 of high-speed registers of three layers and the data saving memory unit 9, that constitute the feature of the present invention.

FIG. 1 shows the hardware structure according to an embodiment of the present invention. In FIG. 1, reference numeral 1 denotes a main memory unit, and 2 denotes a data processing unit. Reference numerals 3 to 5 denote layers of high-speed registers, each layer assuming a shift register structure coupled with a bit as a unit. Reference numeral 6 denotes a switch for reading the data from the layers of high-speed registers to a register and arithmetic logic unit (hereinafter referred to as RALU) 8 or to the data saving memory unit 9, and 7 denotes a switch for writing the data onto the high-speed registers 3 to 5. The operation is as described already with reference to FIGS. 3 and 4.

Figure 6:
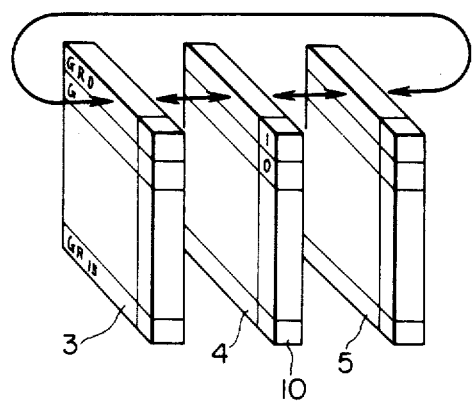
FIGS. 6 and 7 are diagrams illustrating how to use MASK bits according to the present invention.

FIG. 6 describes a layer structure in a three-dimensional manner, in which groups 3 to 5 of high-speed registers are coupled with each bit as a unit. Here, a control bit designated at 10 will be described below. It is now presumed that the program is being executed using the group 3 of high-speed registers. When a subroutine is linked, the contents in the group 3 of registers are directly transferred to the group 4 of registers. At the same time, the control bit (MASK bit) 10 corresponding to a register that is to be saved, assumes the level "1". Under this condition, the subroutine executes the program using the group 4 of registers.

Figure 7:
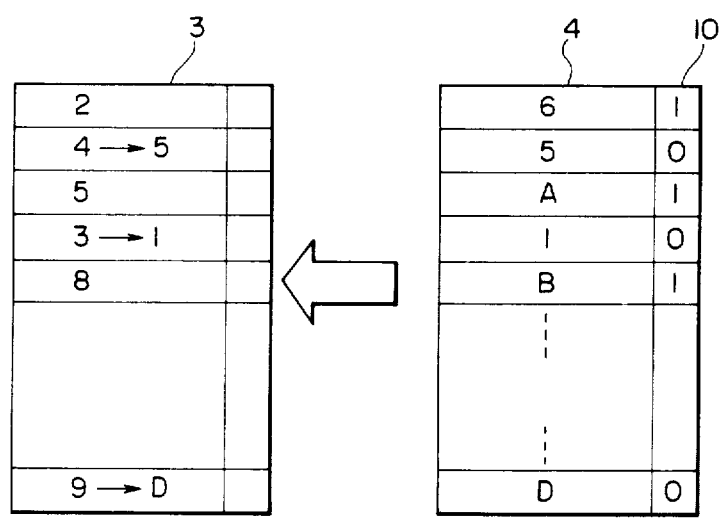

Described below is the case when returning from the subroutine. The contents of registers before the subroutine was linked have been stored in the group 3 of registers. When returning from the subroutine, only the register that is to be saved (register in which the control bit 10 is set to "1" as described above) resumes the operation, and other registers are used for reporting the output data in the subroutine to the main routine. As shown in FIG. 7, therefore, only the portions of control bit 0 designated at 10 are transferred from the group 4 of registers to the group 3 of registers and, at the same time, the main routine performs the switching processing so as to use the group 3 of registers.

The switching is automatically performed by hardware, and virtually no time is required for the switching operation.

Figure 8:
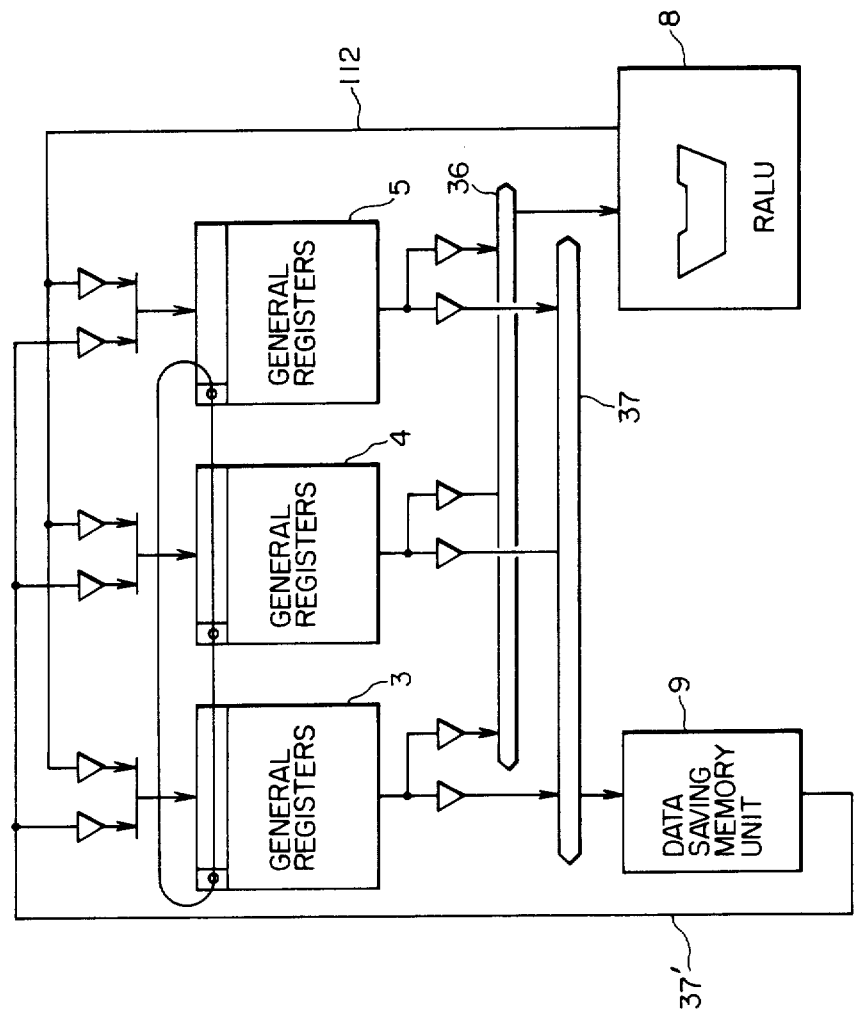
FIG. 8 is a diagram illustrating a data structure according to the present invention.

FIG. 8 is a diagram showing the hardware structure in the data system of the present invention, wherein reference numeral 36 denotes a bus for producing data to the RALU 8, and 37 denotes a bus for producing the data to the data saving memory unit 9. Layers of the groups 3 to 5 of high-speed registers are coupled together with each bit as a unit, to constitute a shift register structure.

Figure 9:
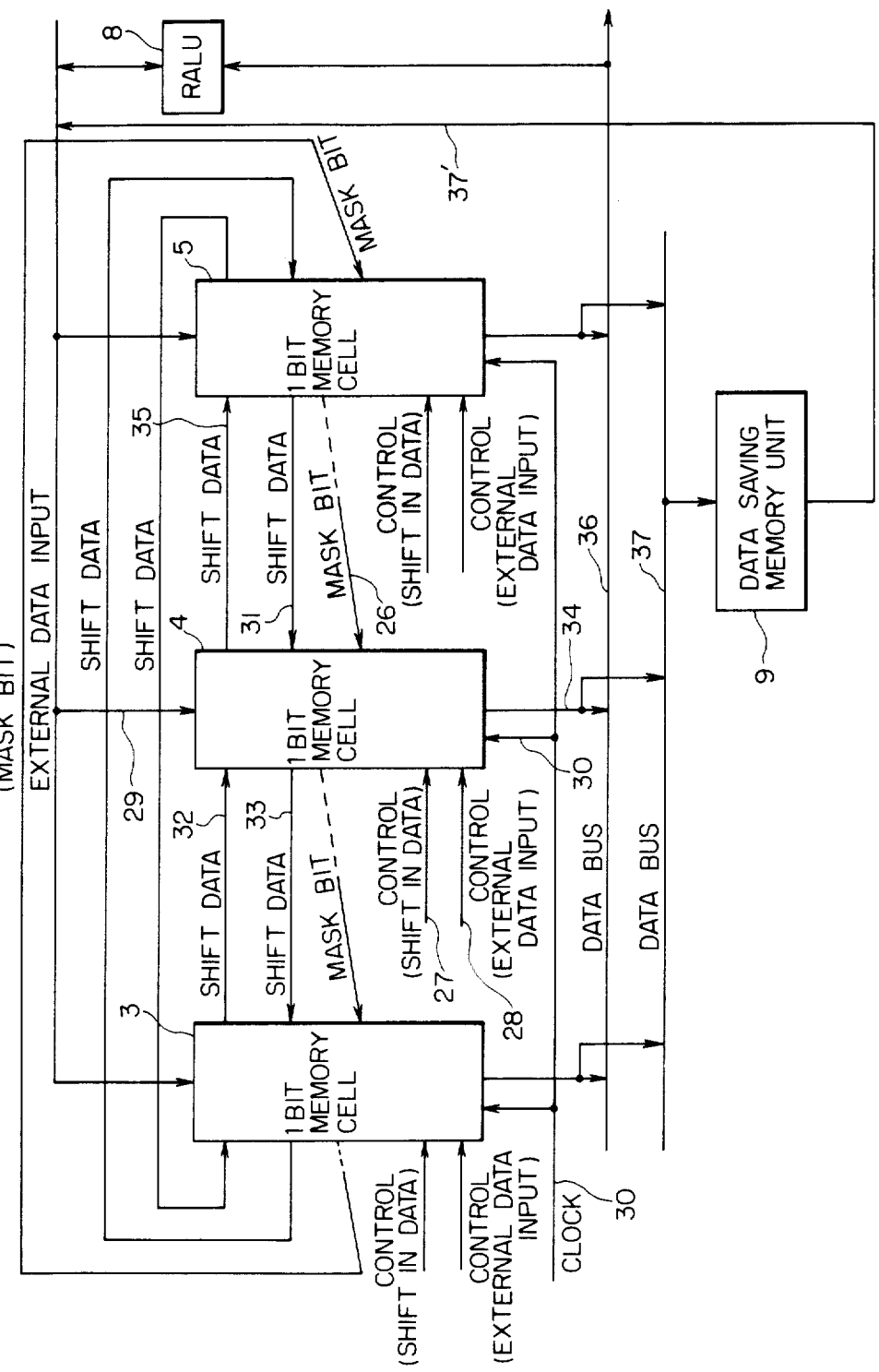
FIG. 9 is a diagram illustrating the connection of 1-bit memory cells constituting general registers 3 to 5 that serve as major portions of the present invention.

FIG. 9 shows the connection of 1-bit memory cells which constitute general registers (groups of high-speed registers) 3 to 5 that are important portions in the present invention, wherein the same reference numerals as those of FIG. 8 denote the corresponding portions.

Figure 10:
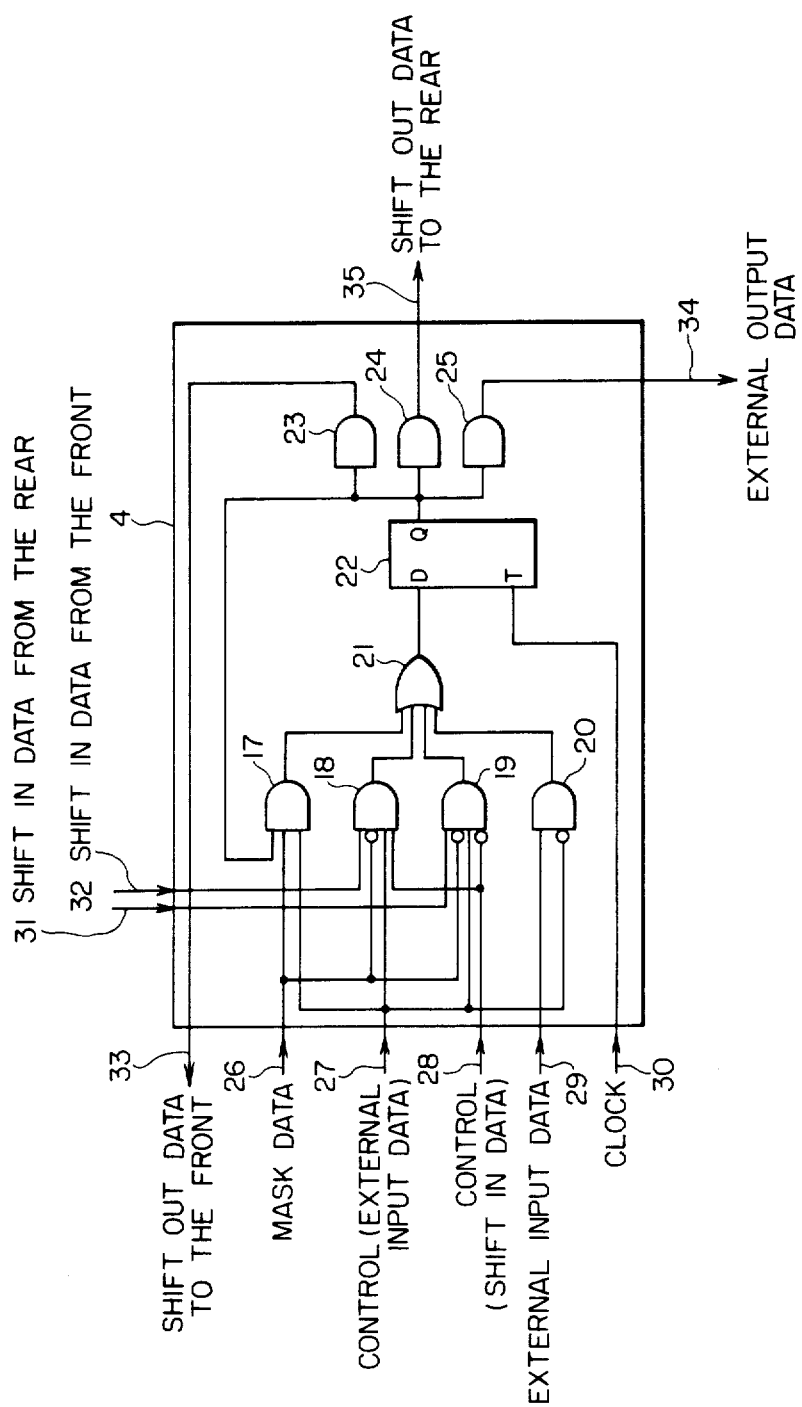
FIG. 10 is a diagram of an embodiment of a logic circuit which constitutes the 1-bit memory cell of FIG. 9.

FIG. 10 shows a logic circuit which constitutes a bit of the groups 3 to 5 of high-speed registers, wherein reference numerals 17 to 21 denote gates for constituting logic that determines the data input to a flip-flop 22, 23 to 25 denote drivers of the output of the flip-flop 22, 30 denotes a clock signal, 26 denotes a MASK signal, 27 denotes an external data input switching signal, 28 denotes a signal for designating shift in data, 29 denotes an external input data, 35 denotes an output signal to a subsequent stage, 34 denotes an output signal to an external unit, 31 and 32 denote shift in data from the subsequent stage, and 33 denotes an output signal to the preceding stage. The groups or layers of high-speed registers are constituted with the above-mentioned circuit as a 1-bit unit.

Figure 11:
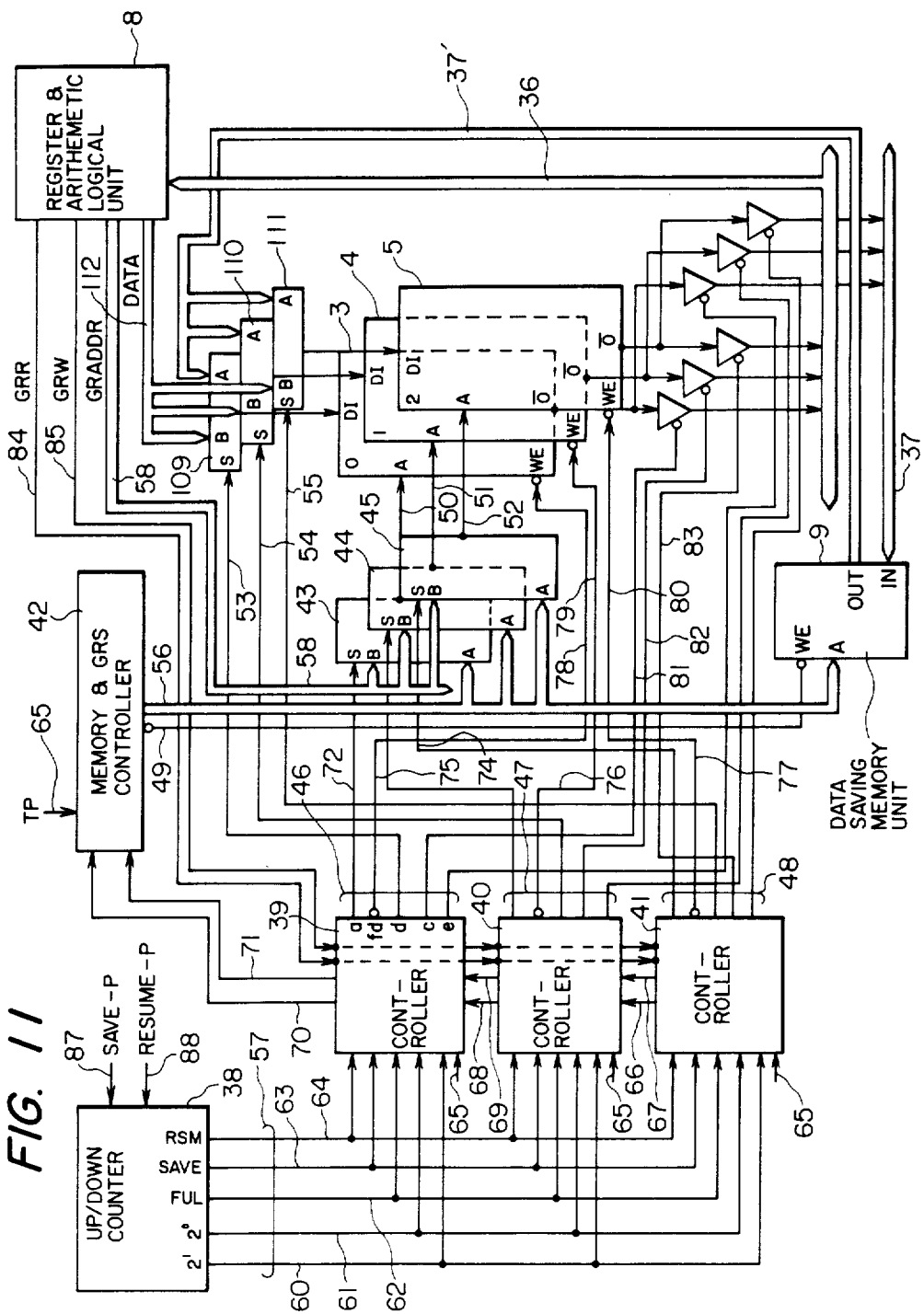
FIG. 11 is a diagram which concretely illustrates the structure according to an embodiment of the present invention.

FIG. 11 shows a concrete structure according to an embodiment of the present invention, which always recognizes which subroutine is being executed relying upon the output of an up/down counter 38. Namely, the counter 38 counts up during the save processing, and counts down during the resume processing. Therefore, which subroutine is being executed will be understood depending upon the output 57 of the counter 38. Outputs of the counter 38 are input to control circuits 39 to 42 to produce control signals that will be sent to the register layers 3, 4, 5 and to the data saving memory unit 9. The control signals include read/write signals and address signals. The address data includes an address (GRADDR) 58 that will be used for the arithmetic operation and an address 56 that will be used for transferring the data to the data saving memory unit 9. Address selectors 43 to 45 are provided to switch the addresses. Namely, the control circuit 39 controls read/write signals sent to the group 3 of high-speed registers, the control circuit 40 controls read/write signals sent to the group 4 of registers, the control circuit 41 controls read/write signals sent to the group 5 of registers, and the control circuit 42 controls signals sent to the data saving memory unit 9.

Reference numerals 46 to 49 denote control signals sent to the groups of registers, and 50 to 52 denote address data. Reference numerals 53 to 55 denote select signals of the address selectors 43 to 45.

Here, the mechanism for transferring the data in two directions among the register layers 3 to 5 consists of an aggregate of the circuit of FIG. 9, and is not described here.

The register layers 3 to 5 are equipped with the address selectors 43 to 45 and with the data selectors 109 to 111, respectively, which will be used depending upon the arithmetic operation and when the data is to be transferred to the data saving memory unit 9. To the address selectors 43 to 45 are input an address 58 that will be used for the arithmetic operation and an address 56 which is produced by the data saving memory unit control circuit 42 and which is used for transferring the data to the data saving memory unit 9. Which one will be selected is determined by signals 72 to 74 produced by the control circuits 39 to 41 that control the operation conditions of the register layers. The data is are input through the data bus 112 of the system of arithmetic operation and through the bus 37 that transfers data relative to the data saving memory unit, and select signals 53 to 55 therefor are produced by the control circuits 39 to 41 like those of the address system.

Figure 12:
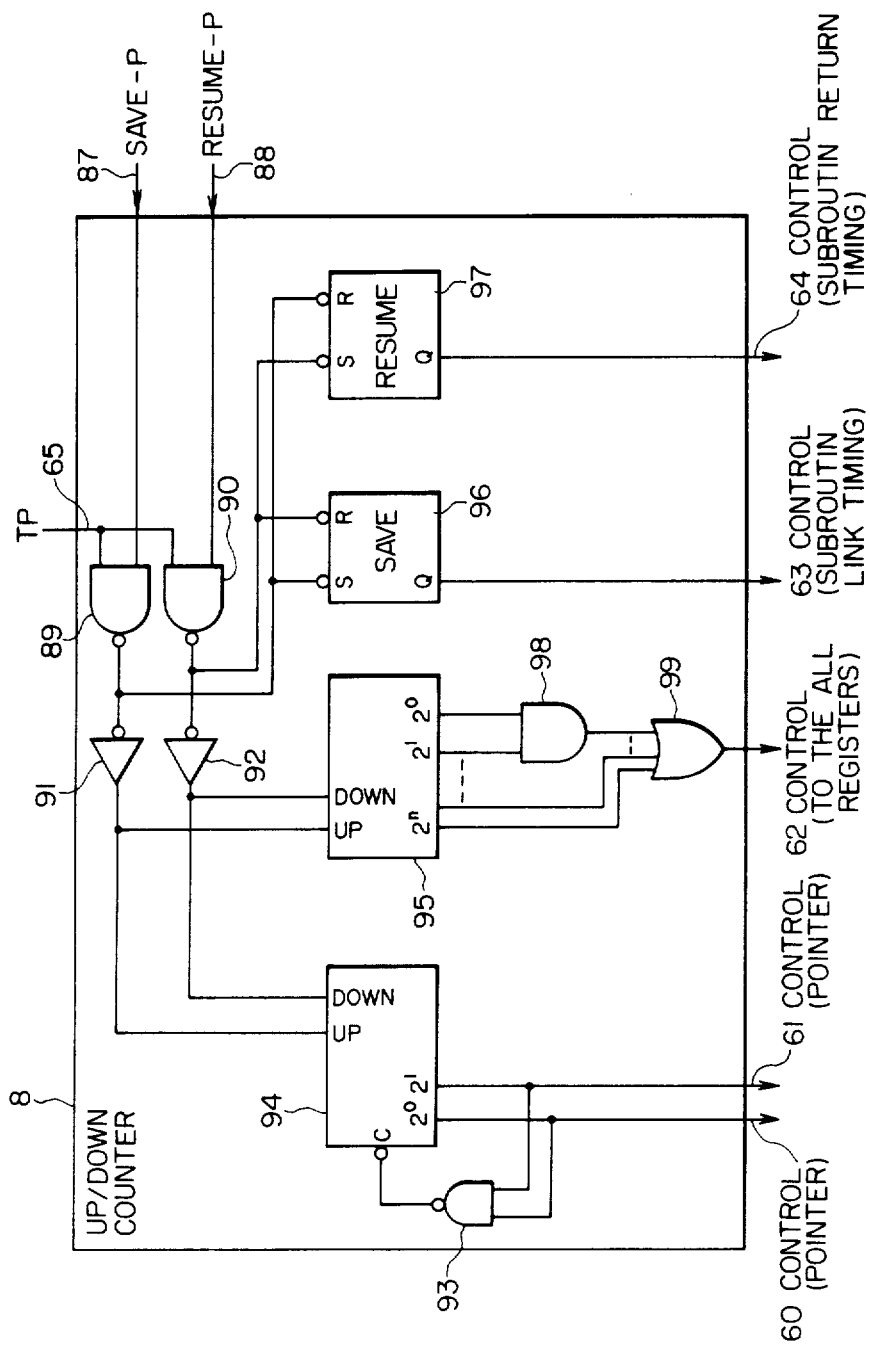
FIG. 12 is a diagram which concretely illustrates the circuit of an up/down counter 38 of FIG. 11.

The up/down counter 38 will be described below. Details of the counter are shown in FIG. 12. To the counter are input SAVE-P 87 which is a subroutine link signal, RESUME-P 88 which is a subroutine return signal, and a timing pulse 65. First, as a subroutine link signal is generated, a flip-flop 96 is saved and, at the same time, counters 94, 95 count up by +1. Here, the counter 94 produces a signal that indicates a register layer which transfers the data to the data saving memory unit 9, and the counter 95 produces a signal that instructs data saving to the data saving memory unit 9 at an early time under the condition where all of the register layers are used.

Reference numerals 96, 97 denote flip-flop circuits. When a subroutine is linked, the flip-flop 96 is set and the flip-flop 97 is reset. When returning from the subroutine, these relations are reversed. Thus, the up-/down counter 38 produces signals 60, 61 that serve as pointers for the register layers, a signal 62 indicating that all of the register layers are used, and signals 63, 64 indicating that the subroutine is linked or returned.

Responsive to these signals, and responsive to general register read signal GRR 84, and general register write signal 85, the control circuits 39, 40 and 41 corresponding to the register layers 3, 4 and 5, determine what should be done by the register layers.

Figure 13:
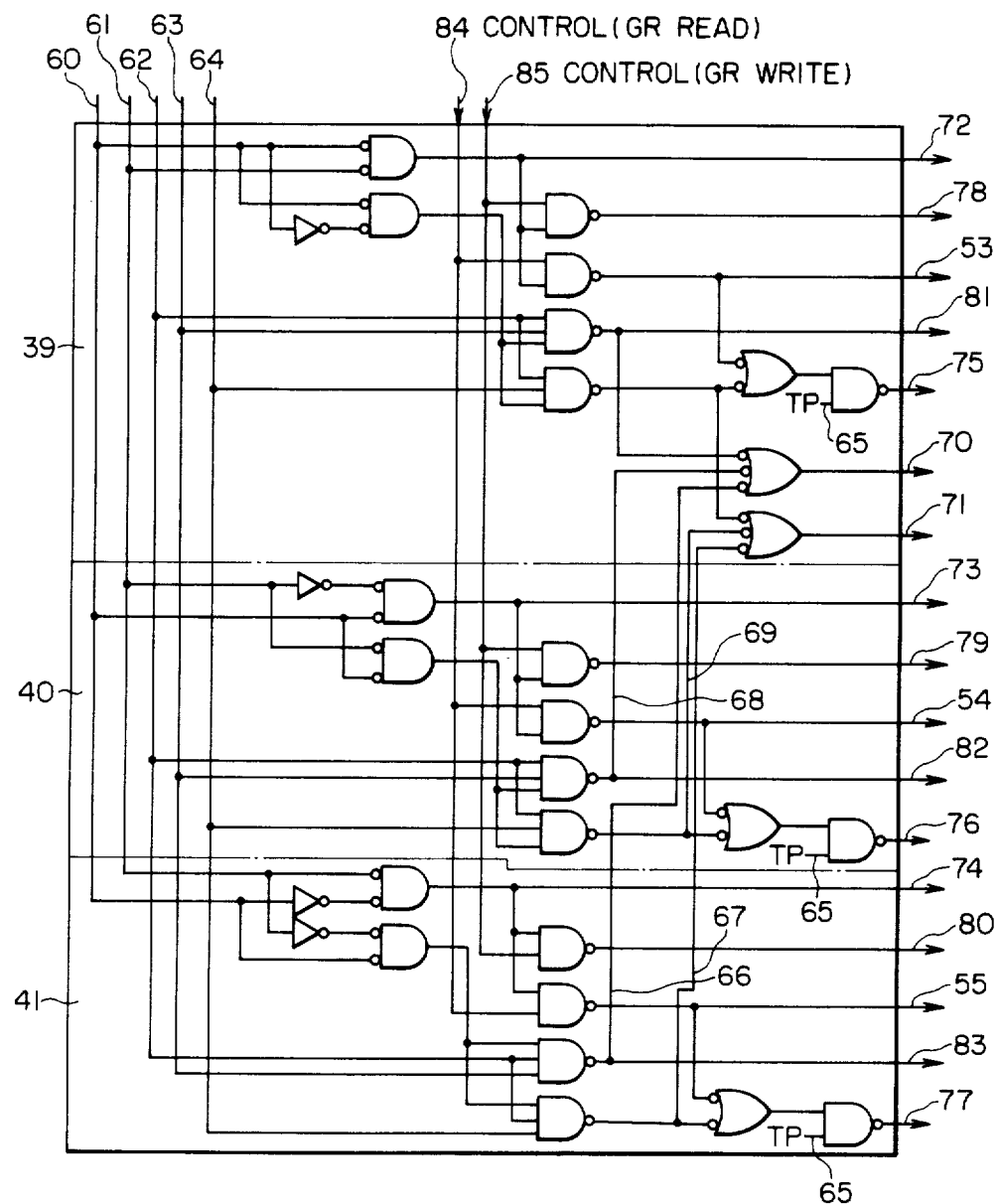
FIG. 13 is a diagram which concretely illustrates the circuits of controllers 39 to 41 of FIG. 11.

FIG. 13 shows details of the control circuits 39, 40 and 41. Output signals will be described below. Reference numerals 72, 73 and 74 denote select signals for address inputs to the register layers. The address 56 is used only when the data is to be transferred to the data saving memory unit 9. Reference numerals 78, 79 and 80 denote gate signals for sending outputs of the register layers onto the data bus 36 during the arithmetic operation. Reference numerals 53, 54 and 55 denote signals for controlling the data input, and reference numerals 81, 82 and 83 denote gate signals for sending the outputs of the registers onto the bus 37 when the data are being transferred to the data saving memory unit 9. Reference numerals 75, 76 and 77 denote write instruction signals that are used when the arithmetic operation is effected for the register layers 3 to 5, or that are used for rewriting the data when the data are resumed from the data saving memory unit 9.

Figure 14:
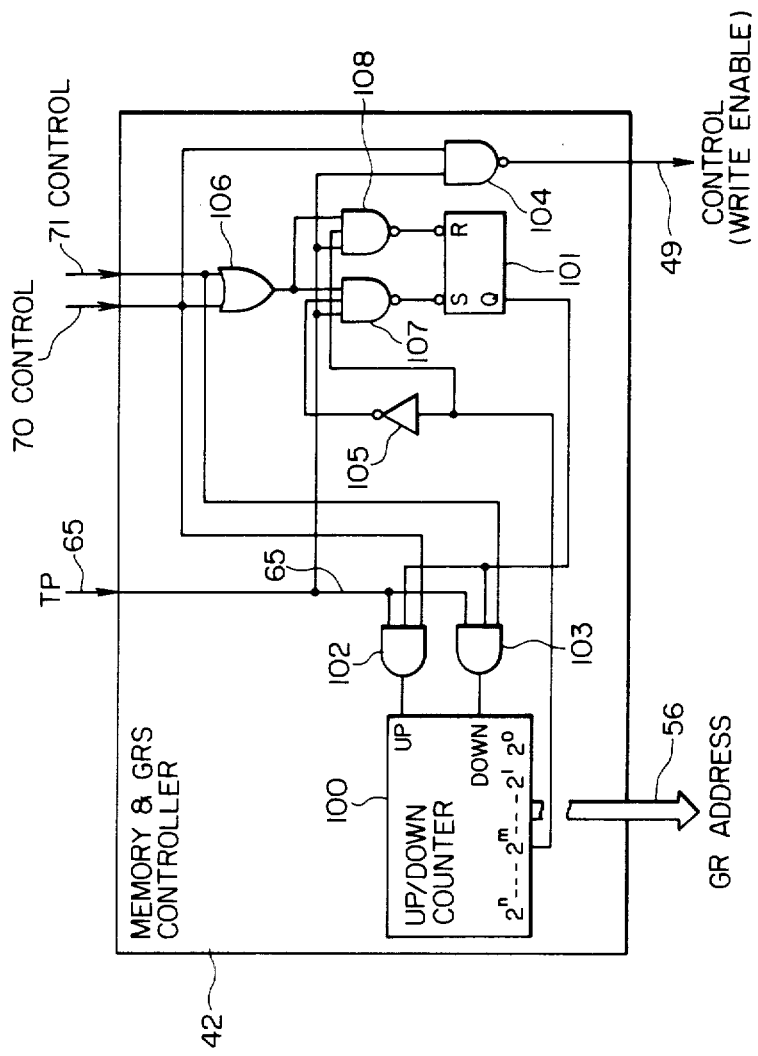
FIG. 14 is a diagram which concretely illustrates the circuit of a memory and GRS controller 42.

When the register layers are all used by utilizing the above signals with the subroutines being linked continuously, the operation is started responsive to the signal 62, and the layer is saved by the data saving memory unit 9. In this case, which layer should be saved is determined by decoding the pointers 60, 61. When the subroutines are returned continuously, the above relation is reversed. In FIG. 13, signals 70, 71 instruct the data saving memory unit transfer control circuit 42 to start or stop the transfer of data to the data saving memory unit. FIG. 14 shows in detail the control circuit 42. Reference numeral 100 denotes an up/down counter which is automatically renewed by an internal clock (timing pulse) 65. The output of the counter 100 serves as an address input 56 to the register layers when the data is transferred to the data saving memory unit. Responsive to data saving memory unit start signals 70, 71, a flip-flop 101 is set and the address is renewed. When the data is to be rewritten, at the same time, a write signal 49 is produced. When the transfer of one surface is completed, the flip-flop 101 is reset, and the transfer operation is finished.

As described above, transfer of data to the data saving memory unit 9 can be effected quite independently of the ordinary arithmetic operation, but simultaneously therewith.

The circuit structure for realizing the function of the present invention is mostly based upon the respective logic, which can be easily constructed in the form of an LSI. Therefore, the function of the present invention can be realized by adding a compact hardware circuit.

According to the present invention, the time for saving and resuming processings can be strikingly shortened at the time of linking subroutines or returning from the subroutines. Therefore, processability of the data processing apparatus is greatly enhanced.

Concretely speaking, virtually no time is required for the saving and resuming processings at the time of linking subroutines or returning from the subroutines, and the processability (performance to execute instruction) of the data processing apparatus can be nearly doubled.

We claim:

1. For operation of a data processing apparatus in the running of successive routines, including a plurality of general registers each for storing data necessary for operation of a routine, memory means for storing data received from said general registers, and means for transferring data from a general register to said memory means when the operation of the data processing apparatus is shifted from one routine into another routine and for retrieving from said memory means and restoring previously stored data to a general register when the one routine is resumed after execution of said other routine, a routine link control method comprising the steps of:
  storing the data necessary to the operation of one routine in a first general register;
  running said one routine on the basis of the data stored in said first general register;
  copying the data in said first general register into a second general register when the operation of the data processing apparatus is shifted from said one routine to a second routine;
  running said second routine on the basis of the data stored in said second general register;
  copying the data in said second register into a third general register and storing the data from said first general register into said memory means when the operation of the data processing apparatus is shifted from said second routine to a third routine; and
  running said third routine on the basis of the data stored in said third general register.

2. A routine link control method according to claim 1, further comprising the steps of:
  copying the data in said third general register into said first general register and storing the data in said second general register in said memory means the operation of said data processing apparatus is shifted from said third routine to a fourth routine; and
  running said fourth routine on the basis of the data stored in said first general register.

3. A routine link control method according to claim 2, further comprising the steps of:
  shifting the data which was previously stored in said second general register from said memory means back into said second general register when said fourth routine is completed;
  shifting the data in said first general register into said third general register; and
  resuming the running of said third routine on the basis of the data stored in said third general register.

4. A routine link control method according to claim 3, wherein each of said general registers includes a plurality of multi-stage registers each including a stage for setting a flag bit, and further including the steps of:
  storing a flag bit in selected registers of said third general register to indicate that the data in those registers is to be saved when the data in the third general register is copied into said first general register; and during the shifting of the data from said first general register to said third general register, retaining without change the data presenting the selected registers of said third general register in which a flag bit is set.

5. In a data processing apparatus for performing operations according to various routines embodied in stored programs in which data for said operations is stored when the operations shift from one routine to another routine, a routine link control apparatus, comprising:

a plurality of general registers each including a plurality of stages, the stages of each general register being connected to corresponding stages of other general registers so that the general registers are connected together in a ring-like configuration whereby data may be transferred from one general register to another in parallel in either direction;

memory means for storing data received from said general registers;

means for copying data from one general register to another general register when the operation of the data processing apparatus is shifted from one routine into another routine; and means for transferring data from a general register into said memory means when all general registers have data stored therein.

6. A routine link control apparatus according to claim 5, wherein said copying means includes means for writing data from one general register into the general register connected on either side thereof in said ring-like configuration, so that data may be passed from general register to general register in either of two directions.

7. A routine link control apparatus according to claim 5, wherein each general register comprises a plurality of multi-stage registers.

8. A routine link control apparatus according to claim 7, wherein each multi-stage register has a stage for setting a flag bit, and wherein said copying means comprises means for writing data from one general register into only those multi-stage registers of another general register which have no flag bit set therein.

* * * * *